United States Patent
Hatrick et al.

[11] Patent Number: 6,151,883
[45] Date of Patent: *Nov. 28, 2000

[54] AIRCRAFT PROPULSIVE POWER UNIT THRUST REVERSER WITH SEPARATION DELAY MEANS

[75] Inventors: Michael John Hatrick, Belfast; Edward Maurice Ashford, Craigavon; Finbarr McEvoy, Dromore Co Down, all of Ireland

[73] Assignee: Short Brothers PLC, Belfast, United Kingdom

[*] Notice: This patent issued on a continued prosecution application filed under 37 CFR 1.53(d), and is subject to the twenty year patent term provisions of 35 U.S.C. 154(a)(2).

[21] Appl. No.: 08/880,949

[22] Filed: Jun. 23, 1997

[30] Foreign Application Priority Data

Jun. 24, 1996 [GB] United Kingdom .................. 9613166

[51] Int. Cl.⁷ ...................................... F02K 3/02
[52] U.S. Cl. ..................... 60/226.2; 60/230; 239/265.29; 244/110 B
[58] Field of Search .................. 60/226.2, 230; 239/265.19, 265.29, 265.31; 244/110 B

[56] References Cited

U.S. PATENT DOCUMENTS

| | | | |
|---|---|---|---|
| 3,347,467 | 10/1967 | Carl et al. | 239/265.31 |
| 3,490,236 | 1/1970 | Markowski | 60/204 |
| 3,599,432 | 8/1971 | Ellis | 60/230 |
| 3,711,013 | 1/1973 | Tontini et al. | 239/265.17 |
| 3,863,867 | 2/1975 | Souslin et al. | 244/12 D |
| 4,047,381 | 9/1977 | Smith | 60/226 A |
| 4,232,516 | 11/1980 | Lewis et al. | 60/226.2 |
| 4,466,587 | 8/1984 | Dusa et al. | 244/121 |
| 4,815,281 | 3/1989 | Gely | 60/226.2 |
| 5,097,662 | 3/1992 | Vieth | 60/226.2 |
| 5,575,147 | 11/1996 | Nikkanen | 60/226.2 |
| 5,713,537 | 2/1998 | Tindell | 60/226.2 |
| 5,819,528 | 10/1998 | Masson | 60/266.2 |

FOREIGN PATENT DOCUMENTS

| | | |
|---|---|---|
| 0 771 945 A1 | 5/1997 | European Pat. Off. . |
| 929121 | 6/1963 | United Kingdom . |
| 1 032 113 | 6/1966 | United Kingdom . |
| 2 009 879 | 10/1977 | United Kingdom . |
| 1 506 588 | 4/1978 | United Kingdom . |
| 2 112 077 | 7/1983 | United Kingdom . |
| 2 285 669 | 7/1995 | United Kingdom . |
| WO 96/20867 | 7/1996 | WIPO . |

*Primary Examiner*—Ted Kim
*Attorney, Agent, or Firm*—Lyon & Lyon LLP

[57] ABSTRACT

In an aircraft propulsive power unit a thrust reversing arrangement includes a flow redirecting structure having a flow redirecting downstream wall against which gaseous fluid flow in a first flow direction impinges to turn the flow into a second flow direction to produce reverse thrust and an upstream wall round which the fluid flow turns and which has a boundary surface so formed as to support adherence of a boundary layer of the redirected fluid flow at the boundary surface. The upstream wall is provided with projecting elements to generate vortices which prevent or delay separation of the boundary layer from the boundary surface of the upstream wall. Alternatively, the upstream wall is formed with a plurality of flow apertures which are connected by a duct to a pressure differential region or source to cause gaseous fluid to flow through the boundary surface of the upstream wall to prevent or delay separation of the boundary layer.

22 Claims, 5 Drawing Sheets

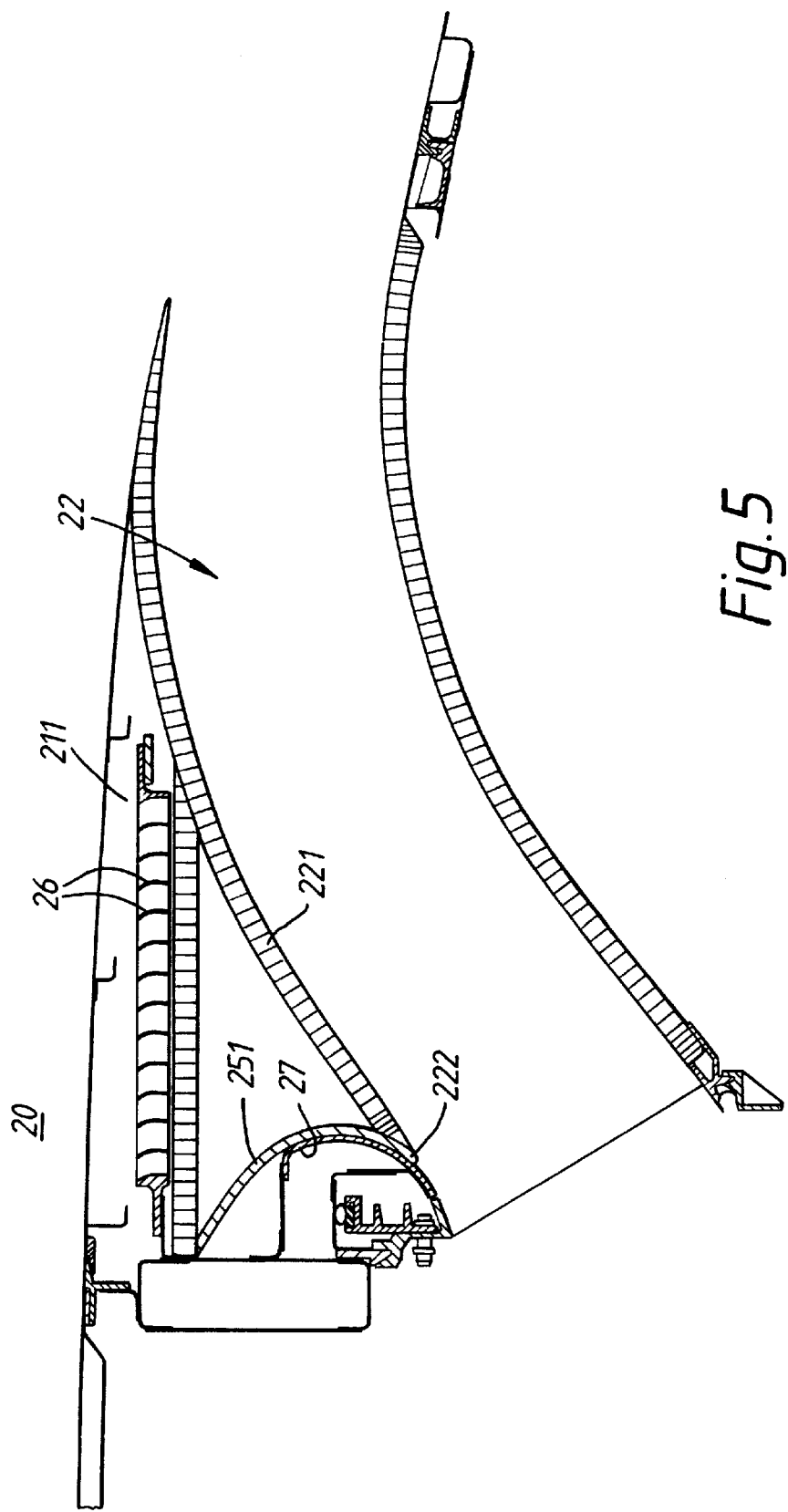

AIRCRAFT PROPULSIVE POWER UNIT THRUST REVERSER WITH SEPARATION DELAY MEANS

The present invention relates to aircraft propulsive power units and is particularly concerned with an aircraft propulsive power unit comprising an efflux duct in which gaseous fluid is conducted in a predetermined first flow direction for discharge from an exit end of the duct in the production of forward thrust, and a thrust reversing arrangement having a flow redirecting structure for diverting gaseous fluid in the duct or gaseous fluid discharging from the exit end of the duct to redirect the flow from the first flow direction to a second flow direction to produce reverse thrust.

Where the propulsive power unit is a turbofan power unit having a core engine producing a primary core flow and a fan duct producing a secondary fan flow, thrust reversal may be achieved by one or more thrust redirecting structures which act on the fan flow or on the core flow or on both the fan flow and the core flow.

Thrust reversal can be achieved by any one or more of a variety of different flow redirecting structures, including but not limited to:
  (a) The use of translating cowls which expose cascade vanes that tend to turn the flow in a forward direction, in conjunction with some device to block normal flow. These are known as cascade reversers and can be used to turn either the fan or the core flow.
  (b) The use of doors which rotate, and simultaneously block the flow and redirect it for thrust reversal. These are known as petal door reversers if they turn only the fan flow, and target reversers if they turn both the fan flow and the core flow. The doors frequently have end and side plates to control and promote the flow turning.

All such flow redirecting structures include a redirecting downstream wall against which fluid flow impinges to turn the flow for reverse thrust and an upstream wall round which the fluid flow turns. In addition to the turning effect produced by the downstream wall and also by the cascade vanes in the case of a cascade reverser, the upstream wall round which the fan flow turns also promotes turning of the flow by virtue of the Coanda effect, and helps to direct flow past any structural obstacles and into an exit opening or to the cascade vanes.

It is an object of the present invention to provide in a flow redirecting structure means to improve the effectiveness of the upstream wall, thus promoting improved flow turning.

According to a first aspect of the present invention, there is provided an aircraft propulsive power unit comprising an efflux duct in which gaseous fluid is conducted in a predetermined first flow direction for discharge from an exit end of the duct in the production of forward thrust, and a thrust reversing arrangement for diverting gaseous fluid in the duct or gaseous fluid discharging from the exit end of the duct to redirect the flow from the first flow direction to a second flow direction to produce reverse thrust, the reversing arrangement having a flow redirecting structure comprising a redirecting downstream wall against which fluid flow in the first flow direction impinges to turn the flow into the second flow direction and an upstream wall round which the fluid flow turns and which has a boundary surface so formed as to support adherence of a boundary layer of the redirected fluid flow at the boundary surface, characterised in that the boundary surface of the upstream wall is further so formed as to generate vortices which prevent or delay separation of the boundary layer from the boundary surface.

In an embodiment of the invention hereinafter to be described, the upstream wall so extends away from the efflux duct as to provide a continuous curved boundary surface of such curvature over at least a part of the wall as to support adherence of the boundary layer of the redirected fluid flow, and the curved boundary surface is selectively disrupted to generate vortices in the boundary layer to prevent or delay boundary layer separation.

In an embodiment of the invention hereinafter to be described, the upstream wall is formed or provided with projecting elements which project from the boundary surface in the region of the leading edge of the surface to generate the vortices in the boundary layer. The projecting elements may take the form of small plates attached to the forward edge of the upstream wall. Alternatively, where the upstream wall is in the form of a curved plate and is secured at its leading edge to support structure by fastening elements, the fastening elements are arranged in their securing dispositions so to project from the boundary surface as to serve as the projecting elements generating the vortices.

In an embodiment of the invention hereinafter to be described, the power unit is housed within support structure and the upstream wall of the flow redirecting structure extends from a forward region of an opening in the efflux duct wall to a forward region of an opening in the outer wall of the support structure. The thrust reversing arrangement in the inoperative disposition closes off the openings and the upstream wall from the efflux duct and holds the downstream wall retracted and in the operative disposition exposes the openings and the upstream wall and so positions the downstream wall as to close off the efflux duct downstream of the efflux duct wall opening.

In an embodiment of the invention hereinafter to be described, the propulsive power unit is a turbofan power unit including a fan duct, and the efflux duct is the fan duct of the unit.

In an alternative embodiment of the invention, the turbofan power unit has a turbine core engine producing primary fluid flow through a discharge duct for discharge from an exit end of the duct, and the efflux duct is the discharge duct of the core engine.

In an embodiment of the invention hereinafter to be described, the thrust reversing arrangement in the inoperative disposition holds the downstream wall retracted and in the operative disposition so positions the downstream wall as to cause fluid flow discharging from the exit end of the efflux duct to impinge upon it to turn the discharged flow into the second flow direction and the upstream wall of the flow redirecting structure extends away from the exit end of the efflux duct.

In a preferred embodiment of the invention hereinafter to be described where the propulsive power unit is a turbofan unit and the efflux duct is the fan duct of the unit, the opening in the fan duct is produced by a rearward displacement of a displaceable rearward portion of the fan duct outer wall. Preferably, the downstream wall is mounted on and for movement with the displaceable rearward portion of the fan duct outer wall and extends outwardly from a leading edge of the displaceable rearward portion.

Furthermore, in the operative disposition of the thrust reversing arrangement the displaceable rearward portion of the fan duct outer wall takes up a disposition in which its leading edge lies adjacent to the fan duct inner wall and the downstream wall of the reversing arrangement takes up a disposition in which it extends from the leading edge of the displaceable rearward portion of the fan duct outer wall to a rearward region of the opening in the outer wall of the support structure.

In an embodiment of the invention hereinafter to be described, the downstream wall of the thrust reversing arrangement has a continuous curved boundary surface complementary to the curved boundary surface of the upstream wall. Preferably, the downstream wall in the inoperative position of the reversing arrangement lies adjacent the boundary surface of the upstream wall.

According to a second aspect of the present invention there is provided an aircraft propulsive power unit comprising an efflux duct in which gaseous fluid is conducted in a predetermined first flow direction for discharge from an exit end of the duct in the production of forward thrust, and a thrust reversing arrangement for diverting gaseous fluid in the duct or gaseous fluid discharging from the exit end of the duct to redirect the flow from the first flow direction to a second flow direction to produce reverse thrust, the reversing arrangement having a flow redirecting structure comprising a redirecting downstream wall against which fluid flow in the first flow direction impinges to turn the flow into the second flow direction and an upstream wall round which the fluid flow turns and which has a boundary surface so formed as to support adherence of a boundary layer of the redirected fluid flow at the boundary surface, characterised by the fact that fluid conveying means are provided to cause gaseous fluid to flow through the boundary surface of the upstream wall to prevent or delay separation of the boundary layer from the boundary surface.

According to a third aspect of the present invention there is provided an aircraft propulsive power unit according to the first aspect of the invention and further characterised by the fact that fluid conveying means are provided to cause gaseous fluid to flow through the boundary surface of the upstream wall to prevent or delay separation of the boundary layer from the boundary surface.

In an embodiment according to the second or third aspect of the invention, the upstream wall has a front face and rear face and the fluid conveying means comprises a plurality of flow apertures extending from the front face to the rear face, and duct means for conveying gaseous fluid from the rear face of the wall to a pressure differential region or source in response to a pressure differential between the fluid pressure at the boundary surface of the wall and the pressure at the pressure differential region or source.

The pressure differential source may be a vacuum pump. Where the propulsive power unit is a turbofan power unit including a fan duct the pressure differential region may be a low pressure region in the fan duct upstream of the upstream wall of the flow redirecting structure. Where the gaseous fluid is fed to the fan duct through a nacelle intake structure the pressure differential region may be a low pressure region at the leading edge of the nacelle intake structure.

Alternatively, where the fan installation includes a fan compartment the pressure differential region may be a low pressure region in the fan compartment.

Embodiments of the invention according to its different aspects will now be described by way of example with reference to the accompanying drawings in which:

FIG. 1. is a schematic cross-section of an aircraft turbofan propulsive power unit including a fan flow cascade thrust reversing arrangement having a flow redirecting structure of conventional form except insofar as the upstream wall of the flow redirecting structure is modified in accordance with the invention.

FIG. 5 is a schematic cross-section of the flow redirecting structure shown in FIG. 4 except insofar that the structure is in an inoperative disposition.

Figure 1:
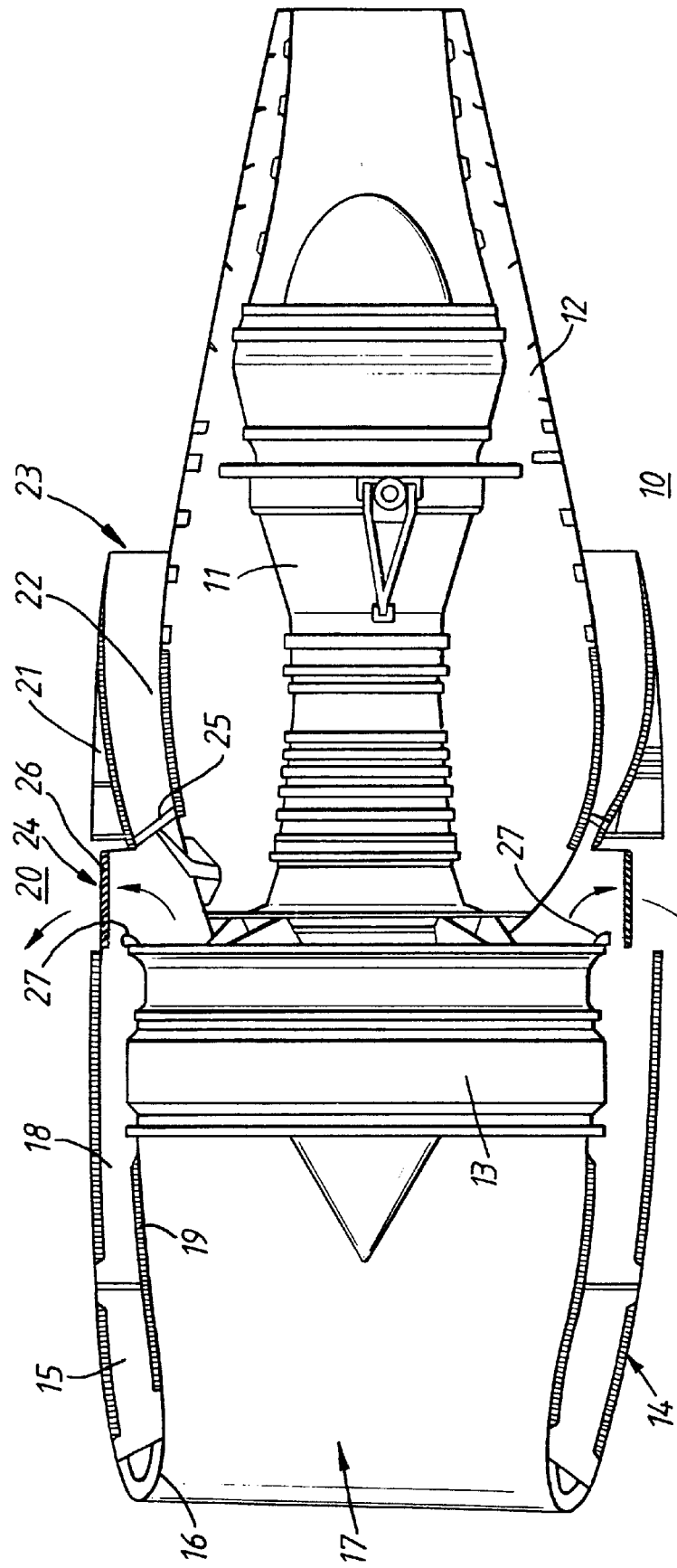

Referring first to FIG. 1, an aircraft turbofan propulsive power unit 10 is schematically illustrated and includes a core engine 11 which is mounted in a core cowl 12 and which drives a fan unit 13 enclosed within a nacelle structure 14. The nacelle structure 14 includes at its forward end an inlet cowl 15 having a leading edge lipskin 16 which defines an intake opening 17, a fan cowl section 18 formed by conventional fan cowl doors and having an inner wall 19 which directs air from the intake opening 17 to the intake to the fan unit 13 and to the intake to the core engine 11.

Located immediately downstream of the fan cowl section 18 is a cascade thrust reverser 20 which is shown in FIG. 1 in its operative thrust reversing disposition. The thrust reverser 20 includes a translating sleeve 21 which is translatable to the disposition shown from an inoperative disposition in which it abuts the fan cowl section 18 of the nacelle structure 14 and defines a fan duct 22 for the flow of air from the fan to a discharge opening 23 in the production of forward thrust.

In the disposition shown in FIG. 1, the translating sleeve 21 has been translated rearwardly to form an opening 24 to which the fan flow is redirected by closure of the fan duct 22 by flow redirecting downstream diverter elements 25 forming part of the flow redirecting structure of the reverser. Cascade vanes 26 extend across the opening 24 and serve to assist in the redirection of the fan flow by the diverter elements 25.

Upstream of the diverter elements 25 is a flow directing upstream wall 27 round which the redirected fan flow turns. The upstream wall 27 is of convex contour and provides a convex boundary surface which supports adherence of the boundary layer of the redirected fan flow by virtue of the Coanda effect.

The upstream wall 27 in accordance with the invention is further so formed as to improve adherence of the fan flow boundary layer as now to be described with reference to FIGS. 2 and 3.

Figure 2:
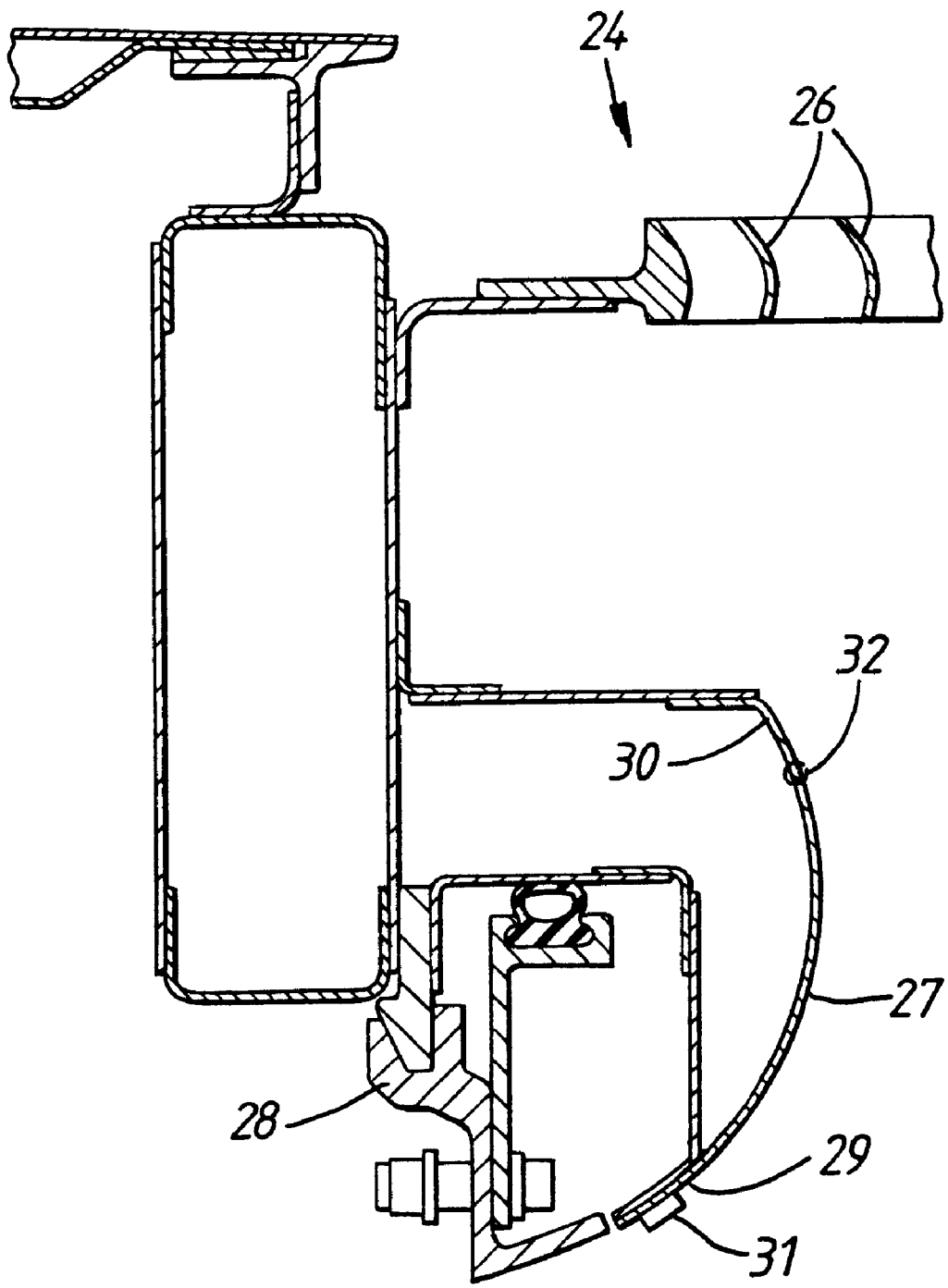
FIG. 2 is a schematic section of a part of the flow redirecting structure of the thrust reversing arrangement shown in FIG. 1, drawn to an enlarged scale and showing the upstream wall of the structure modified according to a first aspect of the invention.

Referring to FIG. 2, it will be seen that the upstream wall 27 extends away from the fan duct outer support structure 28 to provide a continuous curved boundary surface extending from its leading edge 29 to its trailing edge 30 and having a curvature so chosen as to provide for optimum adherence of the boundary layer.

To improve still further the boundary layer adherence by the upstream wall 27 a plurality of small plates 31 are provided along the leading edge 29 of the wall which give rise to vortices in the fan flow along the wall, which are effective to prevent or delay separation of the fan flow boundary layer from the boundary surface of the wall 27, thereby shifting the separation point 32 of the boundary layer to the trailing end 30 of the wall 27.

In constructions hitherto proposed the upstream wall has taken the form of a curved plate and has been secured by fastening elements which attach the leading edge 29 to the support structure and which are countersunk in the wall to reduce drag on the redirected fan flow. Such fastening elements can however in an alternative embodiment of the invention be so fashioned as to provide heads which are not countersunk and which so project above the boundary surface of the wall 27 as to provide for the formation of vortices. The need for additional elements such as the small plates 31 is thereby obviated and would result in reduced manufacturing costs.

Figure 3:
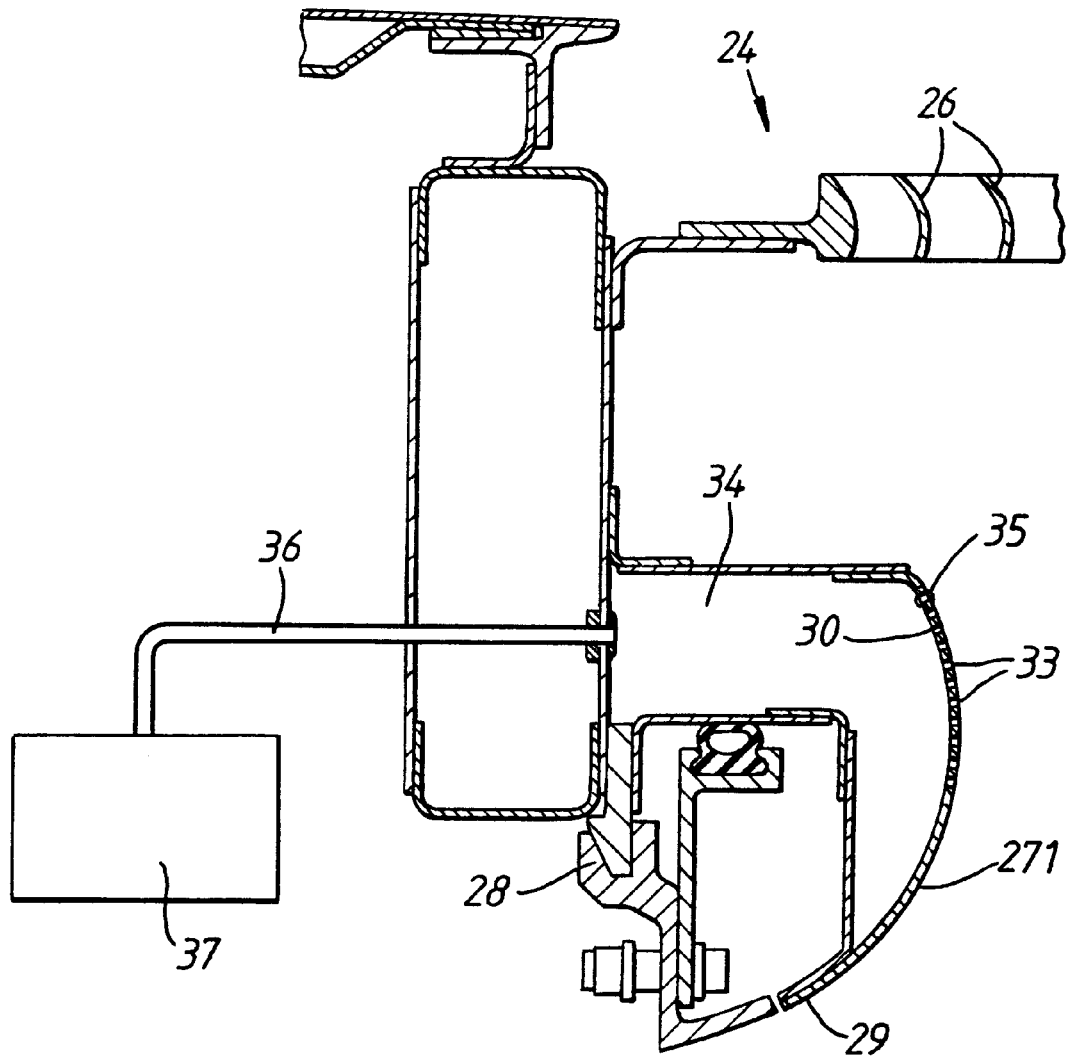
FIG. 3 is a schematic section of a part of the flow redirecting structure of the thrust reversing arrangement shown in FIG. 1, drawn to an enlarged scale and showing the upstream wall of the structure modified according to a second aspect of the invention.

Turning now to FIG. 3, it will be seen that the upstream wall 271 has the same convex contour as the wall 27 shown in FIG. 2; that the vortex generating plates 31 provided in the embodiment shown in FIG. 2 are omitted; and that in accordance with the second aspect of the present invention the wall 271 is formed with apertures 33 which are located over a region of the wall where separation of the boundary layer is likely to occur.

The apertures 33 in the wall 271 are in communication with an airtight chamber 34 formed by the wall 271 and the support structure 28. The airtight chamber 34 is connected by duct means 36 to a pressure differential region or source 37, which may take the form of a vacuum pump and which is at a pressure lower than that at the boundary layer adjacent the wall 271. The low pressure region 37 may alternatively be the leading edge of the inlet cowl 15 of the nacelle structure 14 or the structure 14 or the compartment housing the fan of the fan unit 13. As a result, air is sucked through the apertures 33 in the wall 271 to prevent or delay separation of the boundary layer of the redirected fan flow to a point of separation 35 at the trailing edge 30 of the wall 271. The size of the apertures 33, their spacing from each other and the array which they form are so chosen as to provide for the most effective delay in separation under the flow conditions at the boundary layer during reverse thrust.

The fan flow cascade thrust reverser described with reference to FIG. 1 includes a flow redirecting structure in which rearward translation of the translating sleeve 21 brings about by linkage mechanisms the interposition of the downstream diverter elements 25 to block off the rearmost part of the fan duct 22 and to redirect the fan flow to the opening 24. A relatively large number of diverter elements are needed and although effective in closing off the fan duct 22 they require for their movement the use of pivotal links for each element which increases the complexity of the reverser in that part which is required simply for blocking off of the fan duct 22.

Figure 4:
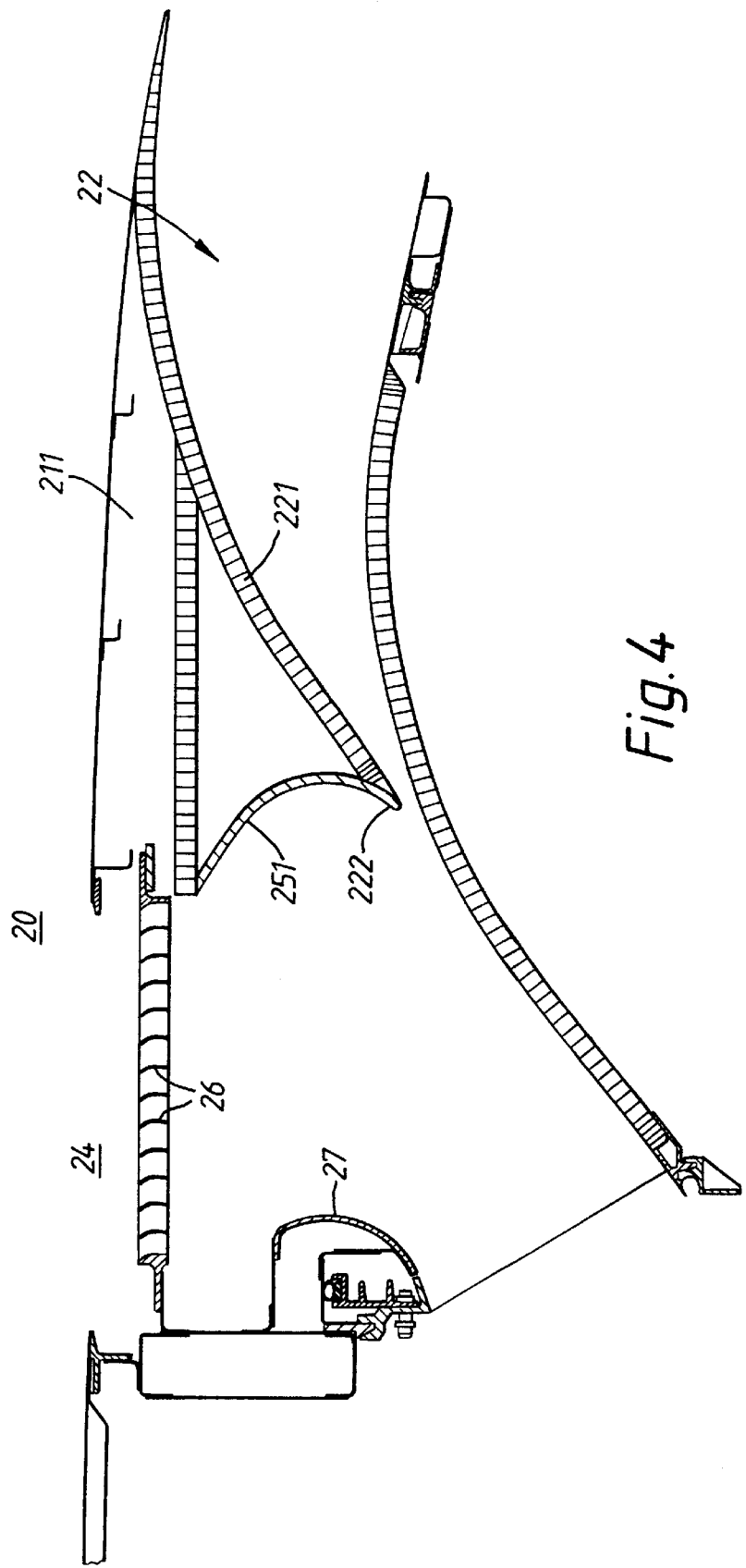
FIG. 4 is a schematic cross-section of a flow redirecting structure shown in its operative disposition for thrust reversal which embodies an upstream wall according to the first or second aspect of the invention and in which the structure is further modified in accordance with a preferred embodiment of the invention.

Turning now to FIG. 4 a thrust reversing arrangement according to a further embodiment of the invention comprises a translating sleeve 211 which is operated in the same manner as the translating sleeve 21 in the reverser shown in FIG. 1. The diverter elements 25 are however dispensed with and the fan duct 22 is blocked off by an outer wall portion 221 of the duct 22 which moves with the sleeve 211 and which carries at its forward end a diverter wall element 251 which serves the same purpose as the diverter elements 25 in the arrangement shown in FIG. 1.

As will be seen, the diverter wall element 251 is of concave contour and in the thrust reversing disposition of the translating sleeve 211 as shown in FIG. 4 takes up a position in which fan flow from the fan unit 13 impinges on it and is redirected to the cascade vanes 26 and the opening 24.

As well as providing for a less abrupt redirection of fan flow, the redirecting element 251 is so configured and arranged on the end 222 of the fan duct wall portion 221 as to provide a surface complementary to that of the convex upstream wall 27, 271 so that in the inoperative disposition of the reverser 20 with the translating sleeve 211 in its forward disposition as shown in FIG. 5, the diverter wall element 251 lies in close proximity to the upstream wall 27, 271.

In the thrust reversing arrangements described with reference to FIGS. 1 to 5 the upstream wall 27, 271 has been modified in accordance with the first and second aspects of the present invention to improve flow over it following redirection of the fan flow from the fan duct in a turbofan propulsive power unit. It will however be appreciated that such modification of the upstream wall can be made for thrust reversing arrangements which act to redirect core flow in the primary discharge duct of the core engine.

Furthermore, where the thrust reversing arrangement acts on primary core flow or on secondary fan flow following discharge from the core flow duct or the fan duct the exit end of the duct can be constructed in the same manner as the upstream wall 27, 271 described with reference to FIGS. 2 and 3 to assist in adherence of the boundary layer in the redirected flow provided that the configuration at the exit end of the duct permits formation of a contoured end wall.

At the time thrust reversal is required following landing of an aircraft the engine is at a low throttle setting, commonly referred to as idle. After the thrust reverser is deployed, the engine throttle setting is changed to some predetermined value, known as the reverse thrust setting. A turbofan engine may, however, take several seconds to accelerate from idle to the reverse thrust setting when the pilot commands a thrust reversal, and this time lapse is a significant feature of reverse thrust operation.

Advantage can be taken of the improved flow turning achieved by the modified upstream wall 27, 271 in a variety of ways.

In order to achieve a particular reverse thrust level, an engine throttle setting must be made which is related to the reverse thrust level by the effectiveness of the reverser. The improved effectiveness of a reverser incorporating the improved upstream wall 27, 271 can be utilized in the following three distinct ways.

Firstly, the same level of reverse thrust may be achieved at a lower throttle setting, reducing wear and tear on the engine, and increasing engine life, and reducing maintenance costs. Also, as a lower thrust setting is required the engine will achieve this thrust setting with less delay in accelerating from flight idle, permitting the same level of reverse thrust to be achieved in a shorter time, which promotes shorter stopping distances.

Secondly, the reverse thrust setting may be left the same, and a larger reverse thrust force will be developed. This may be advantageous if it is desired to increase the weight of the aircraft, for example by increasing the payload.

Thirdly, the improved upstream wall 27, 271 promotes improved flow turning, which in the case of a cascade reverser requires the cascade vanes to perform less of the flow turning function for the same reverser effectiveness. This enables the cascade vanes to be made thinner, and therefore lighter.

In order to operate the thrust reverser some form of hydraulic, pneumatic, electric, or other means of actuation is provided. The actuator must move through sufficient distance to create a flow opening large enough for the reverse air flow to pass through. An additional advantage of this invention is to permit shorter, lighter actuators by turning the flow more rapidly into the opening and achieving the same open area for a shorter actuator movement.

What is claimed is:

1. An aircraft propulsive power unit comprising an efflux duct in which gaseous fluid is conducted in a predetermined first flow direction for discharge from an exit end of the duct in the production of forward thrust, and a thrust reversing arrangement for diverting gaseous fluid in the duct or gaseous fluid discharging from the exit end of the duct to redirect the flow from the first flow direction to a second flow direction to produce reverse thrust, the reversing arrangement having a flow redirecting structure comprising a redirecting downstream wall against which fluid flow impinges in the first flow direction and an upstream wall having a leading edge, the upstream wall round which the fluid flow turns and which has a boundary surface so formed as to support adherence of a boundary layer of the redirected fluid flow at the boundary surface, wherein the upstream wall so extends away from the efflux duct as to provide a continuous convex-shaped curved boundary surface of such curvature over at least a part of the wall as to support adherence of the boundary layer of the redirected fluid flow, and wherein the curved boundary surface is selectively disrupted to generate vortices in the boundary layer to prevent or delay boundary layer separation, and wherein the upstream wall is formed or provided with projecting elements which project from the boundary surface at a location in the region of the leading edge of the boundary surface to generate the vortices in the boundary layer.

2. A unit according to claim 1, wherein the projecting elements take the form of plates attached to the forward edge of the upstream wall.

3. A unit according to claim 1, wherein the upstream wall is in the form of a curved plated secured at its leading edge to support structure by fastening elements which in their securing dispositions so project from the boundary surface as to serve as the projecting elements generating the vortices.

4. A unit according to claim 1, wherein the upstream wall extends from an opening in the efflux duct wall.

5. A unit according to claim 4, wherein the unit is housed within a support structure, wherein an opening is provided in an outer wall of the support structure, wherein the upstream wall of the flow redirecting structure extends from a forward region of the opening in the efflux duct wall to a forward region of the opening in the outer wall of the support structure, wherein the thrust reversing arrangement in an inoperative disposition closes off the opening and the upstream wall and holds the downstream wall retracted, and wherein the reversing arrangement in the operative disposition exposes the openings and the upstream wall and so positions the downstream wall as to close off the efflux duct downstream of the efflux duct wall opening.

6. A unit according to claim 5, wherein the propulsive power unit is a turbofan power unit having a turbine core engine producing primary fluid flow through a discharge duct for discharge from an exit end of the duct, and wherein the efflux duct is the discharge duct of the core engine.

7. A unit according to claim 4, wherein the propulsive power unit is a turbofan power unit including fan duct, and wherein the efflux duct is the fan duct of the unit.

8. A unit according to claim 7, wherein the opening in the fan duct is produced by a rearward displacement of a displaceable rearward portion of the fan duct outer wall.

9. A unit according to claim 8, wherein the downstream wall is mounted on and for movement with the displaceable rearward portion of the fan duct outer wall and extends outwardly from a leading edge of the displaceable rearward portion.

10. A unit according to claim 9, wherein in an operative disposition of the thrust reversing arrangement the displaceable rearward portion of the fan duct outer wall takes up a disposition in which its leading edge lies adjacent to the fan duct inner wall and the downstream wall of the reversing arrangement takes up a disposition in which it extends across the fan duct from the leading edge of the displaceable rearward portion of the fan duct outer wall to a rearward region of the opening in the outer wall of the support structure.

11. A unit according to claim 10, wherein the downstream wall of the thrust reversing arrangement has a continuous curved boundary surface complementary to the curved boundary surface of the upstream wall.

12. A unit according to claim 11, wherein the downstream wall in the inoperative position of the reversing arrangement lies adjacent the boundary surface of the upstream wall.

13. A unit according to claim 1, wherein the upstream wall is provided at the end of the efflux duct.

14. A unit according to claim 13, wherein the upstream wall of the flow redirecting structure extends away from the exit end of the efflux duct, wherein the thrust reversing arrangement in an inoperative disposition holds the downstream wall retracted and in the operative disposition so positions the downstream wall as to cause fluid flow discharging from the exit end of the efflux duct to impinge upon it to turn the discharged flow into the second flow direction.

15. A unit according to claim 14, wherein the propulsive power unit is a turbofan power unit having a turbine core engine producing primary fluid flow through a discharge duct for discharge from an exit end of the duct, and wherein the efflux duct is the discharge duct of the core engine.

16. An aircraft propulsive power unit comprising an efflux duct in which gaseous fluid is conducted in a predetermined first flow direction for discharge from an exit end of the duct in the production of forward thrust, and a thrust reversing arrangement for diverting gaseous fluid in the duct or gaseous fluid discharging from the exit end of the duct to redirect the flow from the first flow direction to a second flow direction to produce reverse thrust, the reversing arrangement having a flow redirecting structure comprising a redirecting downstream wall against which fluid flow in the first flow direction impinges and an upstream wall having a leading edge, the upstream wall round which the fluid flow turns and which has a boundary surface so formed as to support adherence of a boundary layer of the redirected fluid flow at the boundary surface wherein the upstream wall is formed or provided with projecting elements which project from the boundary surface at a location in the region of the leading edge of the boundary surface to generate the vortices in the boundary layer that prevent or delay separation of the boundary layer from the boundary surface, and wherein fluid conveying means are provided to cause gaseous fluid to flow through the boundary surface of the upstream wall to prevent or delay separation of the boundary layer from the boundary surface.

17. A unit according to claim 16, wherein the upstream wall has a front face and rear face and wherein the fluid conveying means comprises a plurality of flow apertures extending from the front face to the rear face, and duct means for conveying gaseous fluid from the rear face of the wall to a pressure differential region or source in response to a pressure differential between the fluid pressure at the boundary surface of the wall and the pressure at the pressure differential region or source.

18. A unit according to claim 17 wherein the pressure differential source is a vacuum pump.

19. A unit according to claim 17, wherein the propulsive power unit is a turbofan power unit including a fan duct and wherein the pressure differential region is a low pressure region in the fan duct located upstream of the upstream wall of the flow redirecting structure.

20. A unit according to claim 17, wherein the propulsive power unit is a turbofan power unit including a fan duct and wherein the fan duct includes a fan compartment and wherein the pressure differential region is a low pressure region in the fan compartment.

21. A unit according to claim 17, wherein gaseous fluid is fed to a fan duct through a nacelle intake structure and wherein the pressure differential region is a low pressure region at a leading edge of the nacelle intake structure.

22. An aircraft propulsive power unit comprising an efflux duct in which gaseous fluid is conducted in a predetermined first flow direction for discharge from an exit end of the duct in the production of forward thrust, and a thrust reversing arrangement for diverting gaseous fluid located in one of the duct and the discharge at the exit end of the duct to redirect the flow from the first flow direction to a second flow direction to produce reverse thrust, the reversing arrangement having a flow redirecting structure comprising a redirecting downstream wall against which fluid flow in the first flow direction impinges to turn the flow into the second flow direction and an upstream wall having a leading edge, the upstream wall round which the fluid flow turns and which has a boundary surface so formed as to support adherence of a boundary layer of the redirected fluid flow at the boundary surface, characterized in that the upstream wall is formed or provided with projecting elements which project from the boundary surface of the upstream wall at a location in the region of the leading edge of the upstream wall to generate vortices in the boundary layer which prevent or delay separation of the boundary layer from the boundary surface.

* * * * *